(12) United States Patent
Miller et al.

(10) Patent No.: US 11,040,648 B2
(45) Date of Patent: Jun. 22, 2021

(54) SPACE FRAME DUMP BODY PIVOT, SUSPENSION NODE, AND REAR FRAME CONNECTION

(71) Applicant: Caterpillar Inc., Peoria, IL (US)

(72) Inventors: Tad W Miller, Bonney Lake, WA (US); David W Holthaus, Monticello, IL (US); Timothy D Harman, Monticello, IL (US); Venkara R Dantuluri, Quincy, MA (US)

(73) Assignee: Caterpillar Inc., Peoria, IL (US)

( * ) Notice: Subject to any disclaimer, the term of this patent is extended or adjusted under 35 U.S.C. 154(b) by 34 days.

(21) Appl. No.: 16/663,815

(22) Filed: Oct. 25, 2019

(65) Prior Publication Data

US 2021/0122284 A1  Apr. 29, 2021

(51) Int. Cl.

| | | |
|---|---|---|
| *B60P 1/04* | (2006.01) | |
| *B60P 1/28* | (2006.01) | |
| *B60G 99/00* | (2010.01) | |
| *B62D 27/02* | (2006.01) | |
| *B62D 21/11* | (2006.01) | |
| *B60P 1/48* | (2006.01) | |

(52) U.S. Cl.
CPC .............. *B60P 1/28* (2013.01); *B60G 99/002* (2013.01); *B60P 1/04* (2013.01); *B62D 21/11* (2013.01); *B62D 27/023* (2013.01); *B60G 2206/14* (2013.01); *B60G 2206/8201* (2013.01); *B60P 1/483* (2013.01)

(58) Field of Classification Search
CPC .................................... B60P 1/04; B60P 1/28
USPC ........ 206/183.2, 205; 298/17 R, 10; 280/796
See application file for complete search history.

(56) References Cited

U.S. PATENT DOCUMENTS

| | | | |
|---|---|---|---|
| 4,129,975 A | 12/1978 | Gabriel | |
| 4,509,879 A | 4/1985 | Pearce | |
| 4,624,090 A | 11/1986 | Stienen | |
| 5,273,317 A | 12/1993 | Kunz et al. | |
| (Continued) | | | |

FOREIGN PATENT DOCUMENTS

DE  102010033289 B4  5/2015

OTHER PUBLICATIONS

International Search Report and Written Opinion, dated Jan. 29, 2021.

*Primary Examiner* — Dennis H Pedder
(74) *Attorney, Agent, or Firm* — Oblon, McClelland, Maier & Neustadt (57) ABSTRACT

A dump body pivot pin, suspension node, and rear frame connection comprises a dump body pivot pin boss, a rear suspension connection boss, outer and inner upper rear frame tube connection bosses, outer and inner lower rear frame tube connection bosses, upper and lower beams, a beam connection web, and a support tube connection boss. The dump pivot pin boss has a pivot bore, a pin bore center axis, and inner and outer flat surfaces. The rear suspension connection boss includes a suspension connection center axis and inner and outer flat surfaces. The upper beam connects the outer and inner upper rear frame tube connection bosses to the dump body pivot pin boss. The lower beam connects the outer lower rear frame connection boss to the rear suspension connection boss and the dump body pivot pin boss and the inner lower rear frame tube connection boss to the dump body pivot pin boss.

20 Claims, 7 Drawing Sheets

(56) References Cited

U.S. PATENT DOCUMENTS

| | | | |
|---|---|---|---|
| 7,762,616 B2* | 7/2010 | Smith | B62D 21/20 |
| | | | 296/184.1 |
| 9,731,773 B2 | 8/2017 | Gami | |
| 9,884,663 B2 | 2/2018 | Czinger | |
| 9,975,179 B2 | 5/2018 | Czinger | |
| 10,183,706 B2 | 1/2019 | Miller | |
| 2004/0036245 A1 | 2/2004 | Mollhagen | |
| 2011/0187178 A1* | 8/2011 | King | B62D 25/20 |
| | | | 298/17 R |
| 2016/0039463 A1 | 2/2016 | Ormiston et al. | |
| 2016/0264189 A1 | 9/2016 | Gami | |
| 2017/0305471 A1 | 10/2017 | Gami et al. | |
| 2018/0208251 A1 | 7/2018 | Miller et al. | |

* cited by examiner

SPACE FRAME DUMP BODY PIVOT, SUSPENSION NODE, AND REAR FRAME CONNECTION

TECHNICAL FIELD

The present disclosure relates to haul trucks, and more particularly to space frame dump body pivot, suspension node, and rear frame connections for haul trucks, and systems, components, and methods thereof.

BACKGROUND

Conventionally, rear haul trucks have a dump body pivotally connected to a haul truck frame adjacent to a rear end of the dump body. A problem can arise with regard to connection between the dump body and the haul truck frame. The connection between the dump body and the haul truck frame can provide for load support points. These load support points can be sensitive to constraints such as manufacturing variations, poor maintenance practices, and/or unreliable support definition. This can lead to added reinforcement of multiple load paths.

Additionally, conventional rear haul trucks may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

U.S. Pat. No. 10,183,706 ("the '706 patent") describes a node for interconnecting frame members of a frame. According to the '706 patent, a plurality of cup-shaped node connectors are disposed on the node body, where each of the node connectors includes a closed end attached to the node body and an open end opposite the closed end and extending away from the node body. The '706 patent also describes that a sidewall extends between and connects the closed end to the open end and a tenon is formed on the open end. According to the '706 patent, the tenon is shaped and sized to fit within a frame member, and a transition is formed between the sidewall and the tenon defining a peripheral, radially outward facing groove in cooperation with the frame member, where the groove is shaped and sized to receive a weld.

SUMMARY OF THE DISCLOSURE

In one aspect, a dump body pivot pin, suspension node, and rear frame connection casting is disclosed. The dump body pivot pin, suspension node, and rear frame connection casting can comprise a dump body pivot pin boss, wherein the dump pivot pin boss has a pivot pin bore, a pin bore center axis, an inner flat surface perpendicular to the pin bore center axis, and an outer flat surface perpendicular to the pin bore center axis; a rear suspension connection boss, wherein the rear suspension connection boss includes a suspension connection center axis, an inner flat surface perpendicular to the suspension connection center axis, and an outer flat surface perpendicular to the suspension connection center axis; an outer upper rear frame tube connection boss; an inner upper rear frame tube connection boss; an outer lower rear frame tube connection boss; an inner lower rear frame tube connection boss; an upper beam having an outer upper beam member connecting the outer upper rear frame tube connection boss to the dump body pivot pin boss, and an inner upper beam member connecting the inner upper rear frame tube connection boss to the dump body pivot pin boss, wherein the outer upper beam member and inner upper beam member are joined at the dump body pivot pin boss and are orientated at a first acute angle with respect to each other; a lower beam having an outer lower beam member connecting the outer lower rear frame connection boss to the rear suspension connection boss and the dump body pivot pin boss, and an inner lower beam member connecting the inner lower rear frame tube connection boss to the dump body pivot pin boss, wherein the outer lower beam member and inner lower beam member are joined at the dump body pivot pin boss and are orientated at a second acute angle with respect to each other; a beam connection web connecting the upper beam to the lower beam, wherein the upper and lower beams are oriented at a third acute angle with respect to each other; and a support tube connection boss having a center axis, wherein the center axis of the support tube connection boss is parallel to the pin bore center axis of the dump body pivot pin boss and the suspension connection center axis of the rear suspension connection boss.

In another aspect, a space frame dump body pivot pin, suspension node, and rear frame connection system for a space frame of a rear haul truck is disclosed. The space frame dump body pivot pin, suspension node, and rear frame connection system can be comprised of a first seven-point dump body pivot pin, suspension node, and rear frame connection casting; and a second seven-point dump body pivot pin, suspension node, and rear frame connection casting spaced from the first seven-point truck body pivot pin, suspension node, and rear frame connection casting in a width direction of the space frame. Each of the first and second seven-point truck body pivot pin, suspension node, and rear frame connection castings can include a dump body pivot pin boss, wherein the dump pivot pin boss has a pivot pin bore, a pin bore center axis, a pin bore vertical centerline perpendicular to the pin bore center axis, an inner flat surface perpendicular to the pin bore center axis, and an outer flat surface perpendicular to the pin bore center axis, a rear suspension connection boss, wherein the rear suspension connection boss includes a suspension connection center axis, an inner flat surface perpendicular to the suspension connection center axis, and an outer flat surface perpendicular to the suspension connection center axis, an outer upper rear frame tube connection boss, an inner upper rear frame tube connection boss, an outer lower rear frame tube connection boss, an inner lower rear frame tube connection boss, an upper beam having an outer upper beam member connecting the outer upper rear frame tube connection boss to the dump body pivot pin boss, and an inner upper beam member connecting the inner upper rear frame tube connection boss to the dump body pivot pin boss, wherein the outer upper beam member and inner upper beam member are joined at the dump body pivot pin boss and are orientated at a first acute angle with respect to each other, a lower beam having an outer lower beam member connecting the outer lower rear frame connection boss to the rear suspension connection boss and the dump body pivot pin boss, and an inner lower beam member connecting the inner lower rear frame tube connection boss to the dump body pivot pin boss, wherein the outer lower beam member and inner lower beam member are joined at the dump body pivot pin boss and are orientated at a second acute angle with respect to each other, a beam connection web connecting the upper beam to the lower beam, wherein the beam connection web includes a curved surface blending the upper and lower beams, and wherein the upper and lower beams are oriented at a third acute angle with respect to each other, and a support tube connection boss having a center axis, wherein the center axis of the support tube connection boss is parallel to the pin bore center axis of the dump body pivot pin boss and the suspension connection center axis of the rear suspension connection boss.

And in yet another aspect, a method regarding a dump body pivot pin, suspension node, and rear frame connection is disclosed. The method can comprise providing a dump body pivot pin boss, wherein the dump pivot pin boss has a pivot pin bore, a pin bore center axis, an inner flat surface perpendicular to the pin bore center axis, and an outer flat surface perpendicular to the pin bore center axis; providing a rear suspension connection boss, wherein the rear suspension connection boss includes a suspension connection center axis, an inner flat surface perpendicular to the suspension connection center axis, and an outer flat surface perpendicular to the suspension connection center axis; providing an outer upper rear frame tube connection boss; providing an inner upper rear frame tube connection boss; providing an outer lower rear frame tube connection boss; providing an inner lower rear frame tube connection boss; providing an upper beam connecting the outer upper rear frame tube connection boss to the dump body pivot pin boss and connecting the inner upper rear frame tube connection boss to the dump body pivot pin boss; providing a lower beam connecting the outer lower rear frame connection boss to the rear suspension connection boss and the dump body pivot pin boss and connecting the inner lower rear frame tube connection boss to the dump body pivot pin boss; providing a beam connection web connecting the upper beam to the lower beam; and providing a support tube connection boss having a center axis, wherein the center axis of the support tube connection boss is parallel to the pin bore center axis of the dump body pivot pin boss and the suspension connection center axis of the rear suspension connection boss. The outer upper rear frame tube connection boss and the inner upper rear frame tube connection boss can be at a first acute angle with respect to each other in a top plan view of the dump body pivot pin, suspension node, and rear frame connection, the outer lower rear frame tube connection boss and the inner lower rear frame tube connection boss can be at a second acute angle with respect to each other in the top plan view of the dump body pivot pin, suspension node, and rear frame connection, and the upper beam and the lower beam can be at a third acute angle with respect to each other in a side elevational view of the dump body pivot pin, suspension node, and rear frame connection.

Other features and aspects of this disclosure will be apparent from the following description and the accompanying drawings.

DETAILED DESCRIPTION

Figure 1:
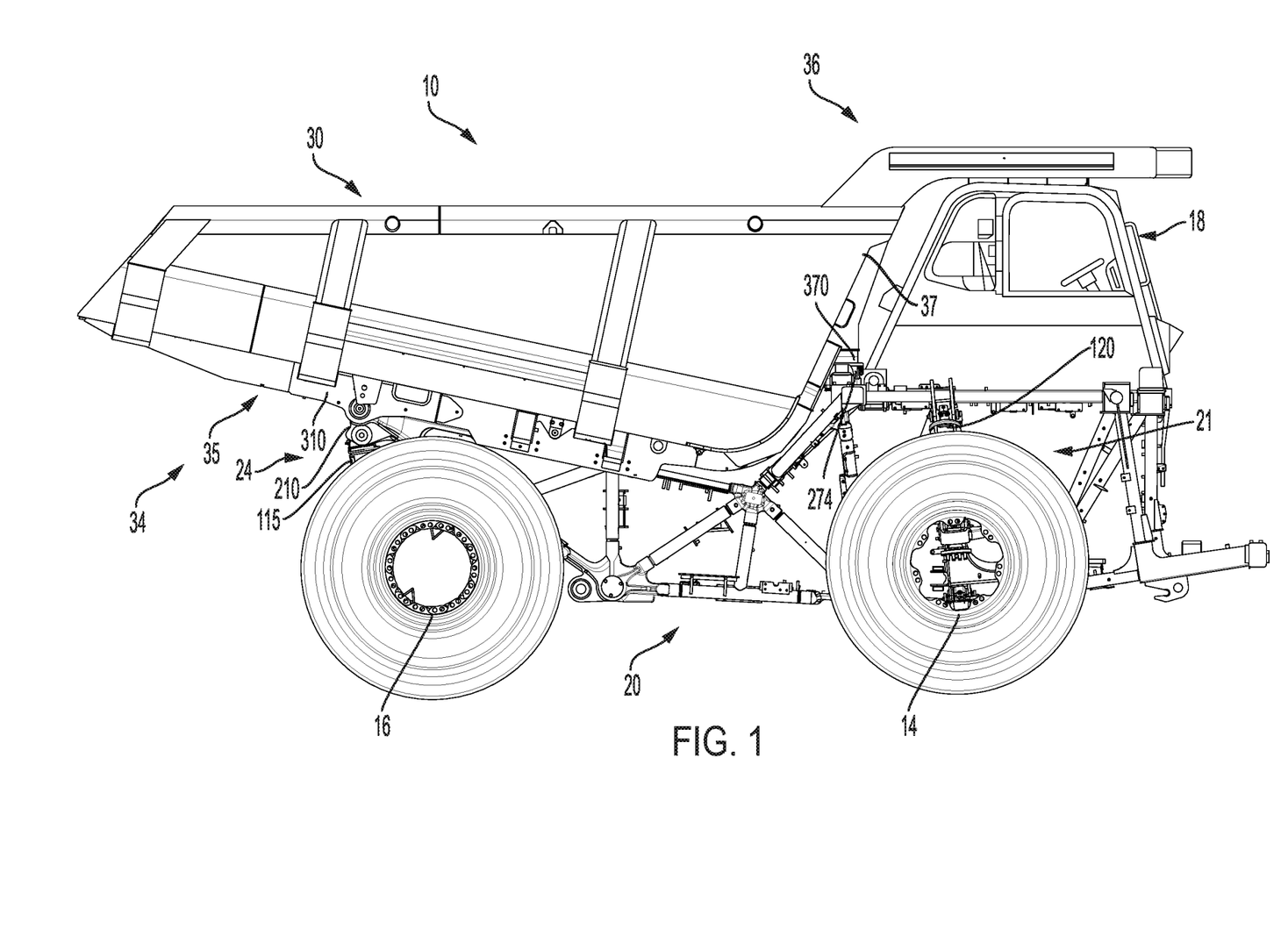
FIG. 1 is a side view of a machine according to embodiments of the disclosed subject matter.
Figure 2:
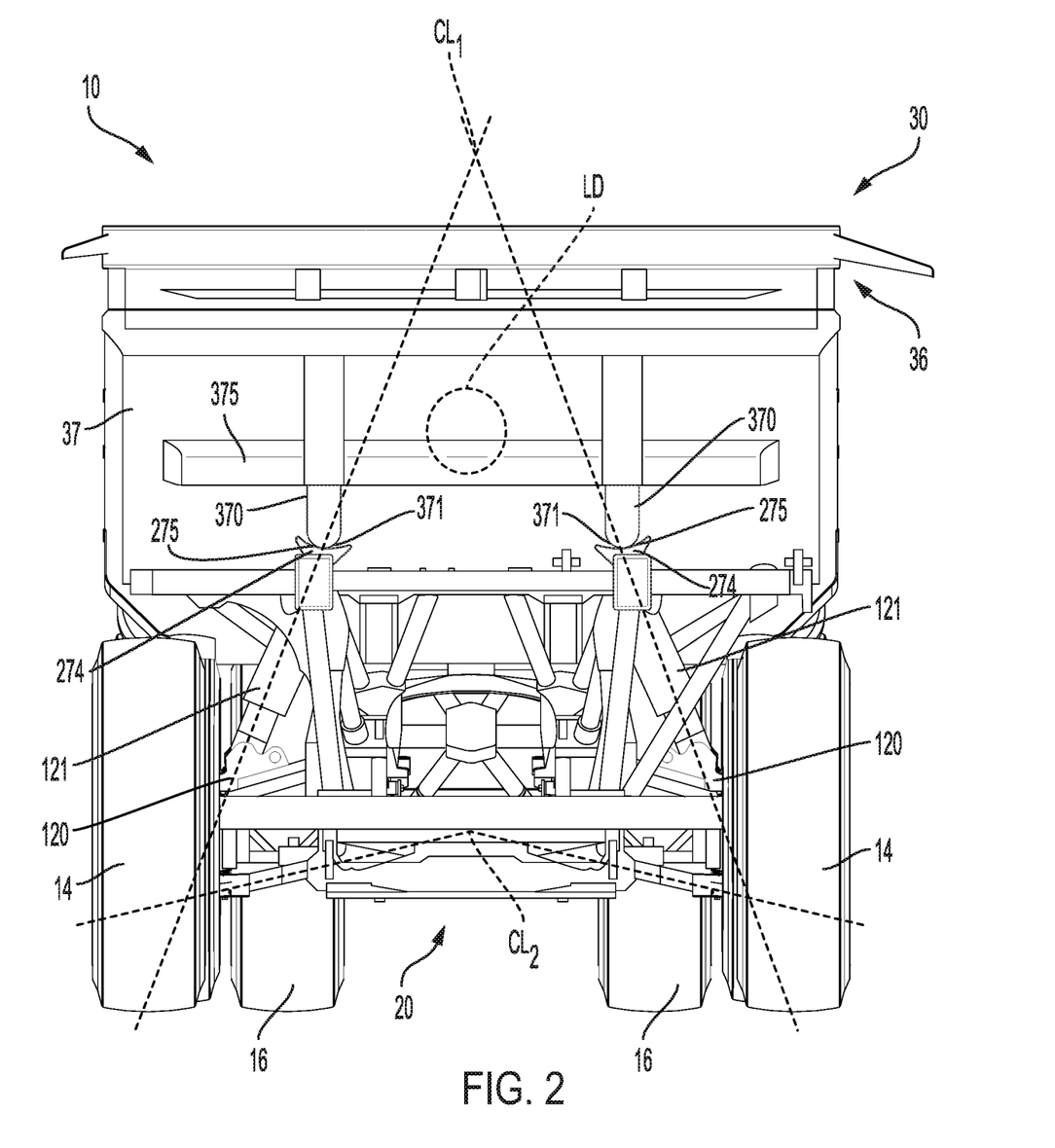
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
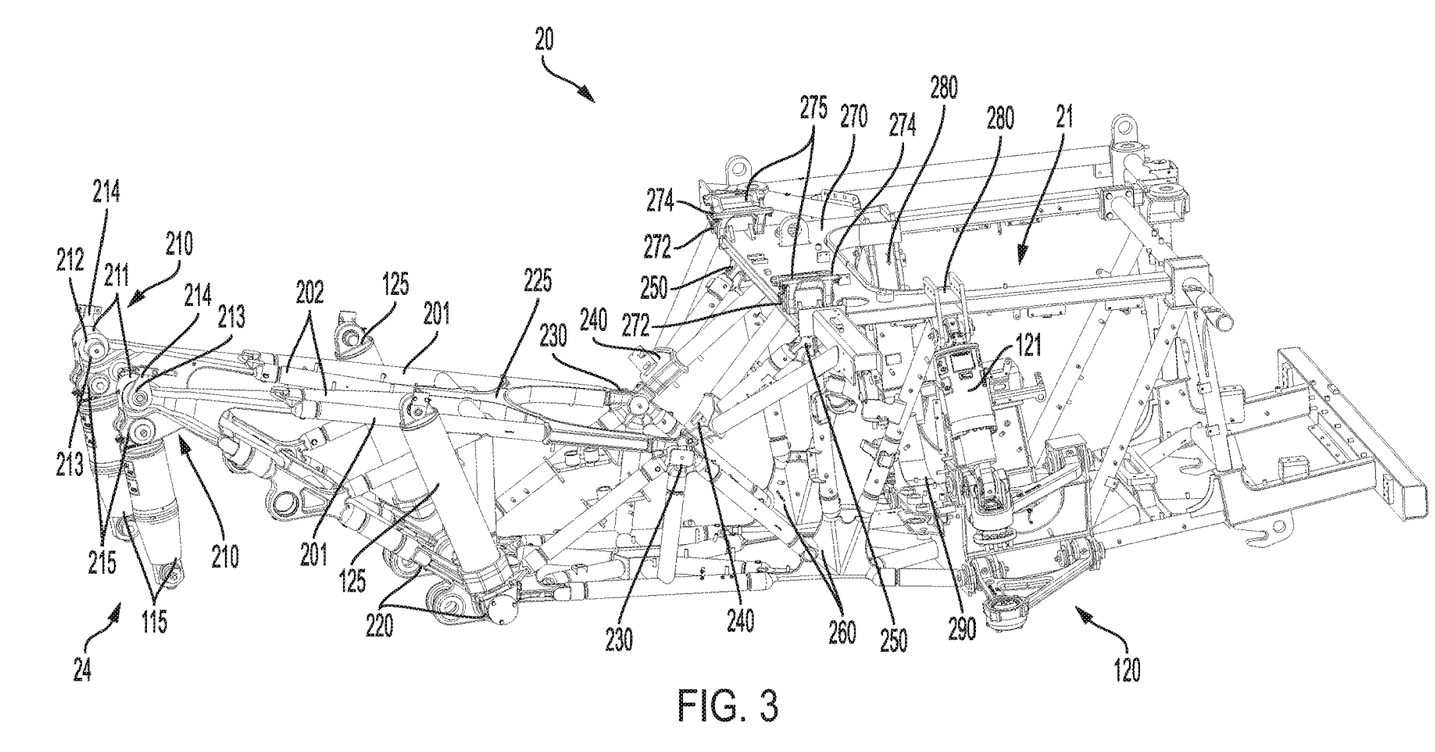
FIG. 3 is a side view of a space frame according to embodiments of the disclosed subject matter.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections may be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. application Ser. No. 16/663,892 filed Oct. 25, 2019 (Case 19-0767); the center upper horizontal frame connection 225 and corresponding connections can be as set forth in U.S. application Ser. No. 16/663,390 filed Oct. 25, 2019 (Case 19-0768); the center upper frame connections 230 and corresponding connections can be as set forth in U.S. application Ser. No. 16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); the front upper suspension connections 280 and corresponding connections can be as set forth in U.S. application Ser. No. 16/664,124 filed Oct. 25, 2019 (Case 19-0759); and/or the front lower suspension connection 290 and corresponding connections can be as set forth in U.S. application Ser. No. 16/664,169 filed Oct. 25, 2019 (Case 19-0760). The foregoing applications are incorporated herein by reference in their entireties.

Figure 4:
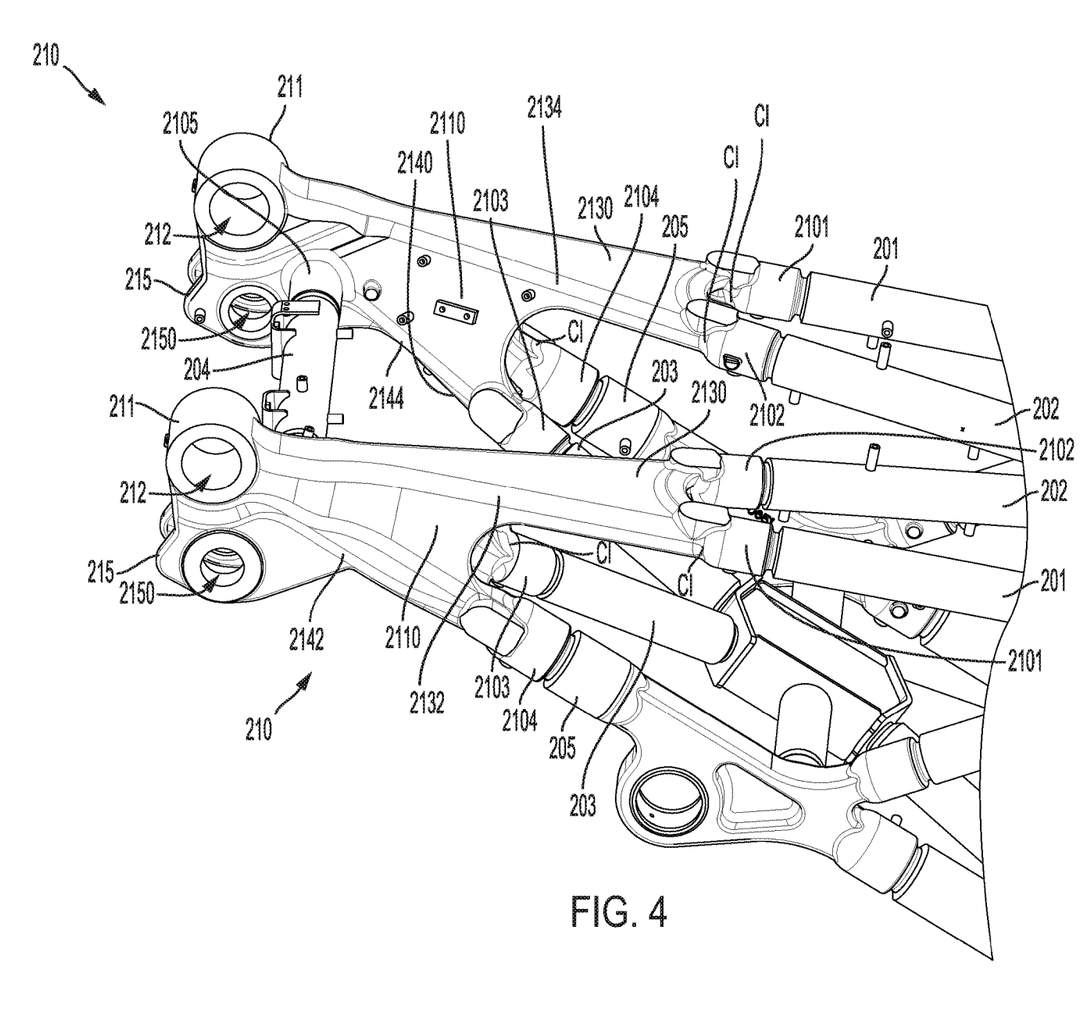
FIGS. 4-6 are side views of space frame dump body pivot, suspension node, and rear frame connections according to embodiments of the disclosed subject matter.
Figure 5:
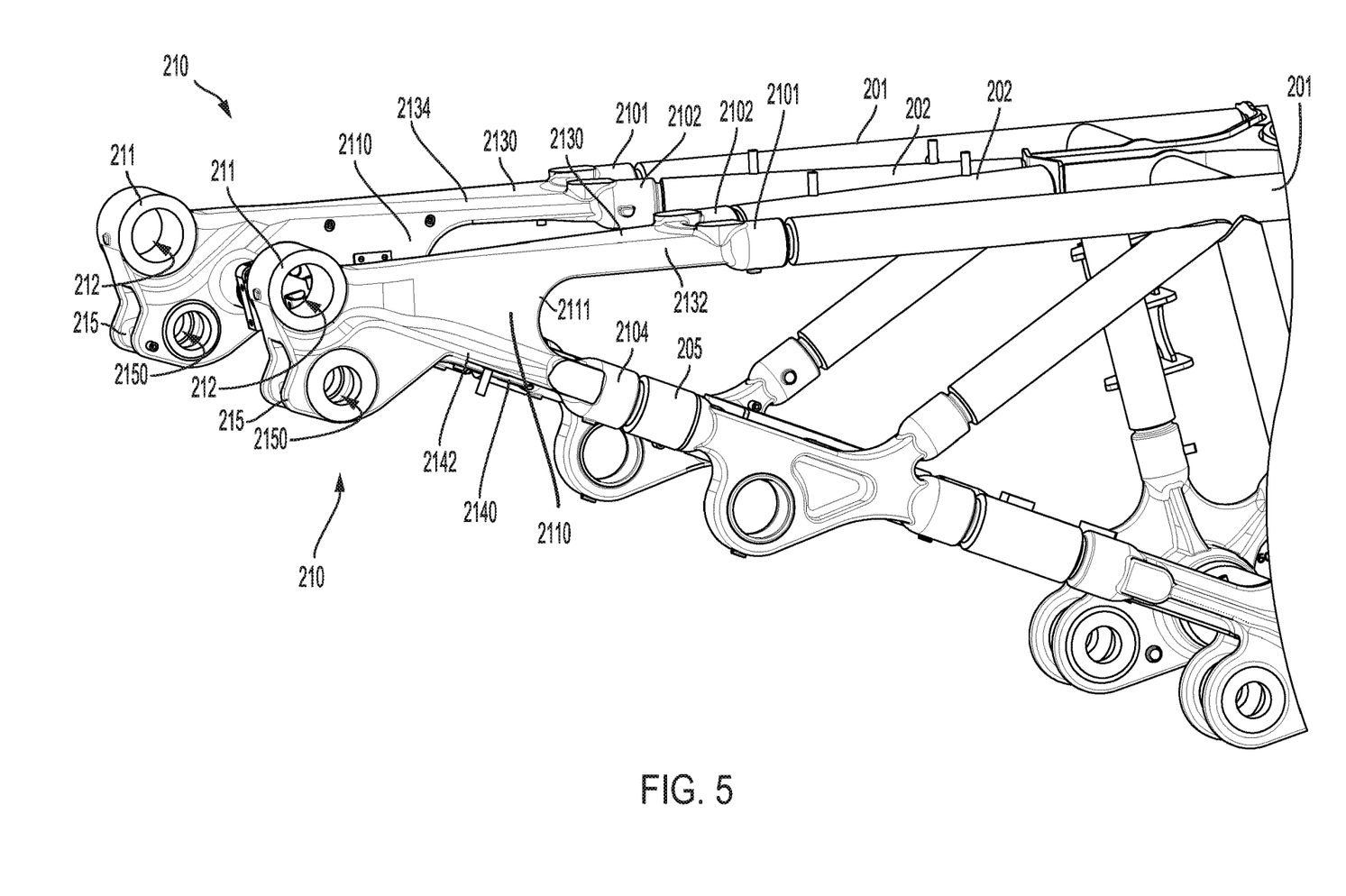
Figure 6:
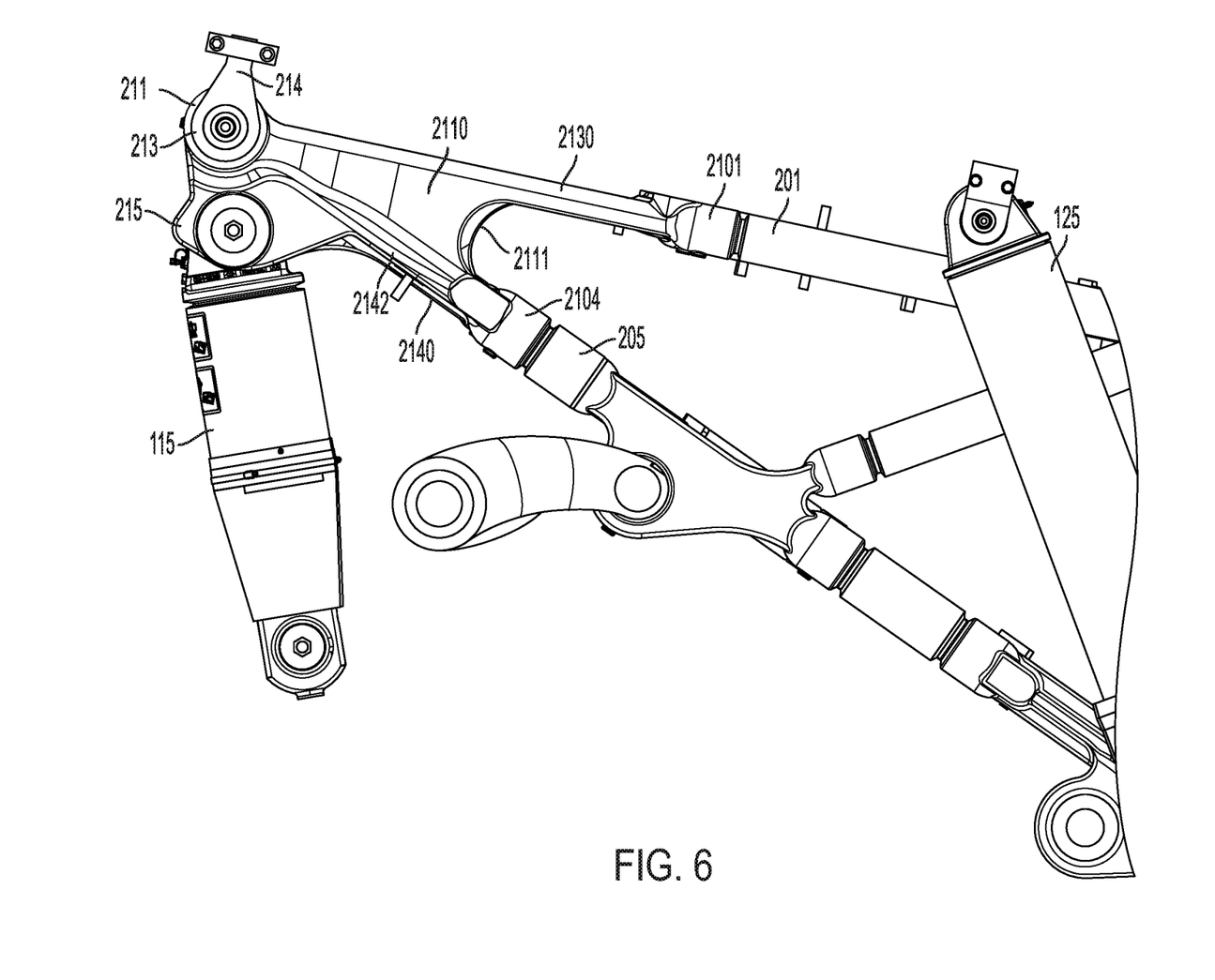

The space frame 20 can also include a plurality of elongate support members, such as elongate support members 201, elongate support members 202, elongate support members 203, elongate support member 204, and elongate support members 205. Elongate support members 201, 202, 203, and 204, according to embodiments of the disclosed subject matter, can be in the form of rods and/or tubes, circular, for instance, where some or all of the rods and/or tubes may be solid or hollow. Elongate support member 205 may be or include a linkage support adapted to be coupled to the rear suspension system, such as shown in FIGS. 4-6. For example, according to embodiments of the disclosed subject matter, the elongate support member 205 can include a linkage casting and a frame tube.

As shown in FIG. 3, each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system.

The rear support 211 can be configured as a pivot pin boss with a pivot pin bore or opening 212 having a pin bore center axis. The pin bore center axis of the pivot pin bore 212 can extend in a width direction of the space frame 20. Moreover, the axes of the pivot pin bores 212 of the rear supports in the form of pivot pin bosses 211 of the pair of rear frame connections 210 may be aligned with each other. That is, the axes of the pivot pin bores 212 can be coaxial or common.

The pivot pin boss 211, which can define the pivot pin bore 212, can have an inner surface that is flat and perpendicular to the pin bore center axis. The pivot pin boss 211 can also have an outer surface that is flat and perpendicular to the pin bore center axis. According to one or more embodiments, the rear support 211 (i.e., pivot pin boss) can be cylindrical. That is, the outer and inner surfaces of the pivot pin boss 211 can be cylindrical, i.e., a solid cylinder except for the pivot pin bore 212, such as shown in FIGS. 4-6. A vertical centerline of the pivot pin bore 212 can be perpendicular to the pin bore center axis.

The pivot pin bore 212 can be configured to receive a pivot pin of a pivot pin interface 213 (see FIGS. 3, 6, and 7) such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

The rear suspension node 215 can be configured as a rear suspension connection boss with a pin bore or opening 2150 having a pin bore center axis. The pin bore center axis of the rear suspension node 215 can extend in the width direction of the space frame 20. Moreover, the axes of the pin bores 2150 of the rear suspension nodes in the form of rear suspension connection bosses 215 of the pair of rear frame connections 210 may be aligned with each other. That is, the axes of the pin bores 2150 can be coaxial or common. Optionally, the rear suspension connection boss 215 can be positioned below the pivot pin boss 211, for instance, such that a portion of the pivot pin boss 211 (e.g., the pivot pin bore 212) overlaps a portion of the rear suspension connection boss 215 (e.g., the pin bore 2150) in a top plan view and a side elevational view of the rear frame connection 210.

The rear suspension connection boss 215, which can define the pin bore 2150, can have an inner surface that is flat and perpendicular to the pin bore center axis of the rear suspension connection boss 215. The rear suspension connection boss 215 can also have an outer surface that is flat and perpendicular to the pin bore center axis. According to one or more embodiments, the rear suspension node 215 (i.e., rear suspension connection boss) can have cylindrical portions. Optionally, as shown in FIGS. 4-6, the rear suspension connection boss 215 can be comprised of two spaced apart cylindrical portions separated by a gap to receive a portion of the rear suspension member 115.

Each rear frame connection 210 can also have an outer upper rear frame tube connection boss 2101, an inner upper rear frame tube connection boss 2102, an inner lower rear frame tube connection boss 2103, an outer lower rear frame tube connection boss 2104, a support tube connection boss 2105, an upper beam 2130, a lower beam 2140, and a beam connection web 2110. Optionally, the upper beam 2130 may be longer than the lower beam 2140.

Generally, the upper beam 2130 can connect the pivot pin boss 211 to the outer upper rear frame tube connection boss 2101 and the inner upper rear frame tube connection boss 2102. More specifically, the upper beam 2130 can have an outer upper beam member 2132 connecting the outer upper rear frame tube connection boss 2101 to the pivot pin boss 211 and an inner upper beam member 2134 connecting the inner upper rear frame tube connection boss 2102 to the pivot pin boss 211. Moreover, the outer upper rear frame tube connection boss 2101 can be fixedly attached (e.g., castably attached) to the outer upper beam member 2132, and the inner upper rear frame tube connection boss 2102 can be fixedly attached (e.g., castably attached) to the inner upper beam member 2134. Respective casting interfaces CI may be provided between each.

The outer upper beam member 2132 and the inner upper beam member 2134 can be joined at the pivot pin boss 211. Such joining can be in terms of the outer upper beam member 2132 and the inner upper beam member 2134 being integral with each other or one-piece. Additionally, the outer upper beam member 2132 and inner upper beam member 2134 can be formed or oriented at an acute angle relative to each other in a top view of the rear frame connection 210. Optionally, the upper beam 2130 can have a curved face between the outer upper beam member 2132 and the inner upper beam member 2134.

Generally, the lower beam 2140 can connect the inner lower rear frame tube connection boss 2103 and the outer lower rear frame tube connection boss 2104 to the pivot pin boss 211 and the rear suspension connection boss 215. More specifically, the lower beam 2140 can have an outer lower beam member 2142 connecting the outer lower rear frame connection boss 2104 to the rear suspension connection boss 215 and the pivot pin boss 211, and an inner lower beam member 2144 connecting the inner lower rear frame tube connection boss 2103 to the pivot pin boss 211 and the rear suspension connection boss 215. Moreover, the outer lower rear frame tube connection boss 2104 can be fixedly attached (e.g., castably attached) to the outer lower beam member 2142, and the inner lower rear frame tube connection boss 2103 can be fixedly attached (e.g., castably attached) to the inner lower beam member 2144. Respective casting interfaces CI may be provided between each.

The outer lower beam member 2142 and the inner lower beam member 2144 can be joined at the pivot pin boss 211. Such joining can be in terms of the outer lower beam member 2142 and the inner lower beam member 2144 being integral with each other or one-piece. Additionally, the outer lower beam member 2142 and the inner lower beam member 2144 can be formed or oriented at an acute angle relative to each other in the top view of the rear frame connection 210. The acute angle can be different from the acute angle formed by the outer upper beam member 2132 and inner upper beam member 2134 of the upper beam 2130. For example, the acute angle of the outer lower beam member 2142 and the inner lower beam member 2144 can be greater than the acute angle of the outer upper beam member 2132 and the inner upper beam member 2134 of the upper beam 2130.

The beam connection web 2110 can connect the upper beam 2130 to the lower beam 2140. Such connection can be integral, i.e., the beam connection web 2110, the upper beam 2130, and the lower beam 2140 can be formed in one piece. Additionally, the upper beam 2130 and the lower beam 2140 can be formed or oriented at an acute angle with respect to each other in a side view of the rear frame connection 210. The acute angle formed by the upper beam 2130 and the lower beam 2140 can be different from the acute angle of the outer lower beam member 2142 and the inner lower beam member 2144 of the lower beam 2140 and/or the acute angle of the outer upper beam member 2132 and the inner upper beam member 2134 of the upper beam 2130. For example, the angle formed by the upper beam 2130 and the lower beam 2140 can be greater than both. Optionally, the beam connection web 2110 can include a curved surface 2111 that blends the upper beam 2130 and the lower beam 2140.

Support tube connection boss 2105 can have a center axis parallel to the pin bore center axis of the pivot pin bore 212 of the pivot pin boss 211 and the pin bore center axis of the pin bore 2150 of the rear suspension connection boss 215. The support tube connection boss 2105 may be offset in a forward direction from the rear suspension connection boss 215 and the pivot pin boss 211 such that no portion of the support tube connection boss 2105 overlaps any portion of the rear suspension connection boss 215 and the pivot pin boss 211 in the top plan view and a side elevational view of the rear frame connection 210.

The rear frame connections 210 can also be coupled to a plurality of elongate support members, including elongate support members 201, elongate support members 202, elongate support members 203, elongate support member 204, and elongate support members 205. According to one or more embodiments of the disclosed subject matter, each of the rear frame connections 210 can be seven-point connections. More specifically, the outer upper rear frame tube connection boss 2101 can be fixedly attached (e.g., welded)

to elongate support member 201, the inner upper rear frame tube connection boss 2102 can be fixedly attached (e.g., welded) to elongate support member 202, the inner lower rear frame tube connection boss 2103 can be fixedly attached (e.g., welded) to elongate support member 203, and the outer lower rear frame tube connection boss 2104 can be fixedly attached (e.g., welded) to elongate support member 205. Additionally, the support tube connection boss 2105 can be fixedly attached (e.g., welded) to elongate support member 204. Thus, the elongate support member 204 can be between the two rear frame connections 210 of the space frame 20. Optionally, each of the outer upper rear frame tube connection boss 2101, the inner upper rear frame tube connection boss 2102, the inner lower rear frame tube connection boss 2103, and the outer lower rear frame tube connection boss 2104 can taper from thick to thin toward the pivot pin boss 211.

Turning back to FIG. 3, the front upper frame connection 270 can be fixedly coupled to the front upper suspension connections 280, and a bottom of the front upper frame connection 270 can be fixedly coupled to the front upper frame connections 250. Additionally, the front upper frame connection 270, which may be a fabrication, can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30.

Figure 7:
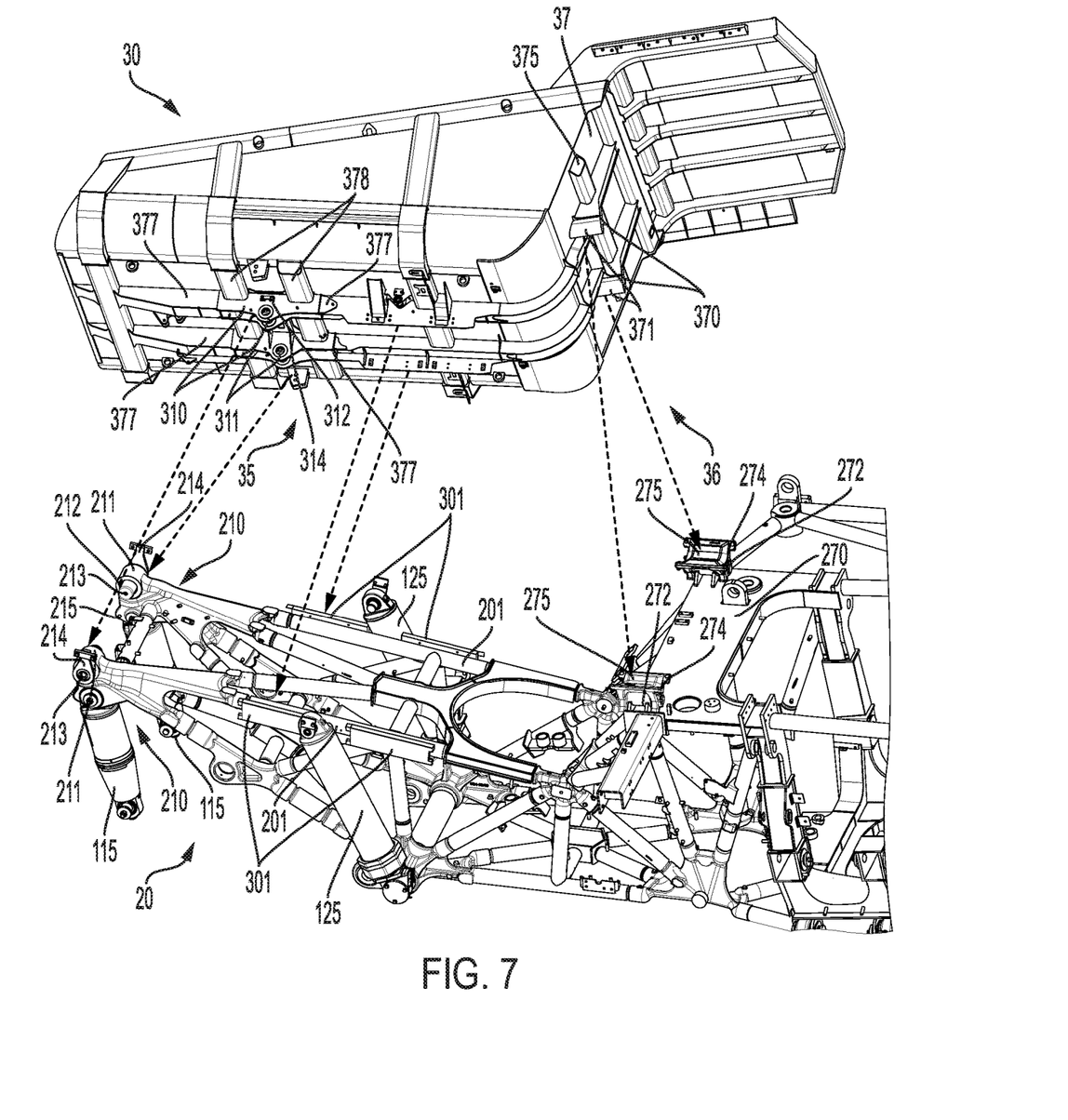
FIG. 7 is an exploded view of the space frame and dump body to show defined contact points according to embodiments of the disclosed subject matter.

Turning now to FIG. 7, the dump body 30 can have, on the bottom 35 thereof, a rear pivot support 310 and a pair of flat contact surfaces 301, and on the front wall 37 thereof, a pair of vertical support structures 370.

The rear pivot support 310 can be provided at the rear portion 34 of the dump body 30, such as shown in FIG. 7. The rear pivot support 310 can have a pair of rear pivots 311. The rear pivots 311 can be spaced apart from each other in a width or lateral direction of the dump body 30, such as shown in FIG. 7. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom 35 of the dump body 30. As shown in FIG. 7, for instance, each rear pivot 311 can be welded in-line with the corresponding longitudinal body support member 377. Thus, the rear pivot 311 can be considered part of the longitudinal body support member 377 (i.e., integral and/or one-piece with).

As shown in FIG. 7, each rear pivot 311 can also include a plurality of cut-outs, for instance, two cut-outs, spaced apart from each other in a length direction of the dump body 30. Each cut-out can receive or accept a transverse body support member 378. Moreover, the cut-outs of one of the rear pivots 311 can receive different transverse body support members 378, for instance, adjacent transverse body support members 378, such as shown in FIG. 7. Additionally, as shown, each transverse body support member 378 can extend through one cut-out of one rear pivot 311 and through an opposing cut-out of the other rear pivot 311.

Each rear pivot 311 can have a pivot bore. FIG. 7, for instance, shows each rear pivot 311 having a pivot bore with two aligned, spaced-apart pivot bore portions. The pivot bore of one rear pivot 311 can be aligned with the pivot bore of the other rear pivot 311 in the width direction of the dump body 30. Thus, the pivot bores can have a common axis. In that the pivot bores can be circular openings, the portion (or portions) of the rear pivot 311 forming the pivot bore can be considered cylindrical.

According to one or more embodiments of the disclosed subject matter, the rear pivots 311 can also include an attachment interface 312 on an outer side surface thereof, such as shown in FIG. 7. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in the pivot bore of the rear pivot 311 (e.g., between the two pivot bore portions of a single rear pivot 311) such that the pivot bore 212 of the rear support 211 is aligned with the pivot bore and such that a pin of the pivot pin interface 213 extends through the pivot bore 212 of the rear support 211 and the pivot bore of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket can be fixedly or removably coupled to the projections, over the arm 214 of the pivot pin interface 213, to prevent the pivot pin interface 213 from moving laterally outward from the rear pivot 311. The bracket can be fixed to the projections via bolts, rivets, or welding as non-limiting examples.

The bottom 35 of the dump body 30 can include the plurality of flat contact surfaces 301, such as shown in FIG. 7. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 7. Moreover, the flat contact surface 301 on one longitudinal support body member 377 can be spaced apart from the flat contact surface 301 on the opposing longitudinal support body member 377 in the width direction of the dump body 30. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 7. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 7 may constitute the flat contact surface 301.

Discussed in more detail below, when the dump body 30 is in a lowered position (i.e., rest position), the flat contact surfaces 301 attached to the dump body 30 can be positioned as shown in FIG. 7. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 10 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, such as shown in FIG. 2 and FIG. 7, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to space frame dump body pivot, suspension node, and rear frame connections for haul trucks, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by the lift cylinders 125, which may be coupled to the center lower frame connections 220.

Referring to FIG. 7, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30.

Each rear frame connection 210, which may be a casting, can have a rear support 211 and a rear suspension node 215. The rear support 211 can be configured as a pivot pin boss with a pivot pin bore or opening 212 having a pin bore center axis. The rear suspension node 215 can be configured as a rear suspension connection boss with a pin bore or opening 2150 having a pin bore center axis. Each rear frame connection 210 can also have an outer upper rear frame tube connection boss 2101, an inner upper rear frame tube connection boss 2102, an inner lower rear frame tube connection boss 2103, an outer lower rear frame tube connection boss 2104, a support tube connection boss 2105, an upper beam 2130, a lower beam 2140, and a beam connection web 2110.

The upper beam 2130 can connect the pivot pin boss 211 to the outer upper rear frame tube connection boss 2101 and the inner upper rear frame tube connection boss 2102. An outer upper beam member 2132 and an inner upper beam member 2134 of the upper beam 2130 can be formed or oriented at an acute angle relative to each other in a top view of the rear frame connection 210. Thus, the outer upper rear frame tube connection boss 2101 and the inner upper rear frame tube connection boss 2102 can also be oriented with respect to each other at the acute angle.

The lower beam 2140 can connect the inner lower rear frame tube connection boss 2103 and the outer lower rear frame tube connection boss 2104 to the pivot pin boss 211 and the rear suspension connection boss 215. A outer lower beam member 2142 and an inner lower beam member 2144 of the lower beam 2140 can be formed or oriented at an acute angle relative to each other in the top view of the rear frame connection 210. Thus, the inner lower rear frame tube connection boss 2103 and the outer lower rear frame tube connection boss 2104 can also be oriented with respect to each other at the acute angle.

The outer upper rear frame tube connection boss 2101 can be fixedly attached (e.g., castably attached) to the outer upper beam member 2132, and the inner upper rear frame tube connection boss 2102 can be fixedly attached (e.g., castably attached) to the inner upper beam member 2134 such that respective casting interfaces CI are therebetween. Likewise, the outer lower rear frame tube connection boss 2104 can be fixedly attached (e.g., castably attached) to the outer lower beam member 2142, and the inner lower rear frame tube connection boss 2103 can be fixedly attached (e.g., castably attached) to the inner lower beam member 2144 such that respective casting interfaces CI are therebetween.

The beam connection web 2110 can connect the upper beam 2130 to the lower beam 2140. The upper beam 2130 and the lower beam 2140 can be formed or oriented at an acute angle with respect to each other in a side view of the rear frame connection 210.

The rear frame connections 210 can also be coupled to a plurality of elongate support members, including elongate support members 201, elongate support members 202, elongate support members 203, elongate support member 204, and elongate support members 205. More specifically, the outer upper rear frame tube connection boss 2101 can be fixedly attached (e.g., welded) to elongate support member 201, the inner upper rear frame tube connection boss 2102 can be fixedly attached (e.g., welded) to elongate support member 202, the inner lower rear frame tube connection boss 2103 can be fixedly attached (e.g., welded) to elongate support member 203, and the outer lower rear frame tube connection boss 2104 can be fixedly attached (e.g., welded) to elongate support member 205. Additionally, the support tube connection boss 2105 can be fixedly attached (e.g., welded) to elongate support member 204. Thus, the elongate support member 204 can be between the two rear frame connections 210 of the space frame 20. Optionally, each of the outer upper rear frame tube connection boss 2101, the inner upper rear frame tube connection boss 2102, the inner lower rear frame tube connection boss 2103, and the outer lower rear frame tube connection boss 2104 can taper from thick to thin toward the pivot pin boss 211. Such tapering can push stress points away from the ends of the tube connection bosses.

Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311. The rear supports 211 can also be pivotally connected to respective rear suspension members 115 and indirectly connected other components of the rear suspension system via elongate support member 205.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 7. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral or horizontal forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Additionally, because the support rockers 274 can pivot laterally and independently of each other, and because both the support rockers 274 and the vertical support structures 370 have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Additionally shown in FIG. 2, in a front view the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 274/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A space frame dump body pivot pin, suspension node, and rear frame connection system for a space frame of a rear haul truck, comprising:
    a first seven-point dump body pivot pin, suspension node, and rear frame connection casting; and
    a second seven-point dump body pivot pin, suspension node, and rear frame connection casting spaced from the first seven-point truck body pivot pin, suspension node, and rear frame connection casting in a width direction of the space frame,
    wherein each of the first and second seven-point truck body pivot pin, suspension node, and rear frame connection castings includes:
        a dump body pivot pin boss, wherein the dump pivot pin boss has a pivot pin bore, a pin bore center axis, a pin bore vertical centerline perpendicular to the pin bore center axis, an inner flat surface perpendicular to the pin bore center axis, and an outer flat surface perpendicular to the pin bore center axis,
        a rear suspension connection boss, wherein the rear suspension connection boss includes a suspension connection center axis, an inner flat surface perpendicular to the suspension connection center axis, and an outer flat surface perpendicular to the suspension connection center axis,
        an outer upper rear frame tube connection boss,
        an inner upper rear frame tube connection boss,
        an outer lower rear frame tube connection boss,
        an inner lower rear frame tube connection boss,
        an upper beam having an outer upper beam member connecting the outer upper rear frame tube connection boss to the dump body pivot pin boss, and an inner upper beam member connecting the inner upper rear frame tube connection boss to the dump body pivot pin boss, wherein the outer upper beam member and inner upper beam member are joined at the dump body pivot pin boss and are orientated at a first acute angle with respect to each other,
        a lower beam having an outer lower beam member connecting the outer lower rear frame connection boss to the rear suspension connection boss and the dump body pivot pin boss, and an inner lower beam member connecting the inner lower rear frame tube connection boss to the dump body pivot pin boss, wherein the outer lower beam member and inner lower beam member are joined at the dump body pivot pin boss and are orientated at a second acute angle with respect to each other,
        a beam connection web connecting the upper beam to the lower beam, wherein the beam connection web includes a curved surface blending the upper and lower beams, and wherein the upper and lower beams are oriented at a third acute angle with respect to each other, and
        a support tube connection boss having a center axis, wherein the center axis of the support tube connection boss is parallel to the pin bore center axis of the dump body pivot pin boss and the suspension connection center axis of the rear suspension connection boss.

2. The space frame dump body pivot pin, suspension node, and rear frame connection system according to claim 1, wherein the first, second, and third acute angles are different.

3. The space frame dump body pivot pin, suspension node, and rear frame connection system according to claim 1, wherein the tube connection bosses are adapted to have fixedly attached thereto respective frame tubes or suspension linkages.

4. The space frame dump body pivot pin, suspension node, and rear frame connection system according to claim 1, wherein the dump body pivot pin boss is a solid cylinder except for the pivot pin bore.

5. The space frame dump body pivot pin, suspension node, and rear frame connection system according to claim 1, wherein the rear suspension connection boss is below the dump body pivot pin boss such that a portion of the dump body pivot pin boss overlaps a portion of the rear suspension connection boss in a top plan view and a side elevational view of the space frame dump body pivot pin, suspension node, and rear frame connection system.

6. The space frame dump body pivot pin, suspension node, and rear frame connection system according to claim 1, wherein the upper beam is longer than the lower beam.

7. The space frame dump body pivot pin, suspension node, and rear frame connection system according to claim 1, wherein the support tube connection boss is offset in a forward direction from the rear suspension connection boss and the dump body pivot pin boss such that no portion of the support tube connection boss overlaps any portion of the rear suspension connection boss and the dump body pivot pin boss in a top plan view and a side elevational view of the space frame dump body pivot pin, suspension node, and rear frame connection system.

8. The space frame dump body pivot pin, suspension node, and rear frame connection system according to claim 1, wherein each of the tube connection bosses except the support tube connection bosses tapers from thick to thin toward the dump body pivot pin boss.

9. A dump body pivot pin, suspension node, and rear frame connection casting comprising:
 a dump body pivot pin boss, wherein the dump pivot pin boss has a pivot pin bore, a pin bore center axis, an inner flat surface perpendicular to the pin bore center axis, and an outer flat surface perpendicular to the pin bore center axis;
 a rear suspension connection boss, wherein the rear suspension connection boss includes a suspension connection center axis, an inner flat surface perpendicular to the suspension connection center axis, and an outer flat surface perpendicular to the suspension connection center axis;
 an outer upper rear frame tube connection boss;
 an inner upper rear frame tube connection boss;
 an outer lower rear frame tube connection boss;
 an inner lower rear frame tube connection boss;
 an upper beam having an outer upper beam member connecting the outer upper rear frame tube connection boss to the dump body pivot pin boss, and an inner upper beam member connecting the inner upper rear frame tube connection boss to the dump body pivot pin boss, wherein the outer upper beam member and inner upper beam member are joined at the dump body pivot pin boss and are orientated at a first acute angle with respect to each other;
 a lower beam having an outer lower beam member connecting the outer lower rear frame connection boss to the rear suspension connection boss and the dump body pivot pin boss, and an inner lower beam member connecting the inner lower rear frame tube connection boss to the dump body pivot pin boss, wherein the outer lower beam member and inner lower beam member are joined at the dump body pivot pin boss and are orientated at a second acute angle with respect to each other;
 a beam connection web connecting the upper beam to the lower beam, wherein the upper and lower beams are oriented at a third acute angle with respect to each other; and
 a support tube connection boss having a center axis, wherein the center axis of the support tube connection boss is parallel to the pin bore center axis of the dump body pivot pin boss and the suspension connection center axis of the rear suspension connection boss.

10. The dump body pivot pin, suspension node, and rear frame connection casting according to claim 9, wherein respective casting interfaces are provided between the upper beam and the outer and inner upper rear frame tube connection bosses and between the lower beam and the outer and inner lower rear frame tube connection bosses.

11. The dump body pivot pin, suspension node, and rear frame connection casting according to claim 9, wherein the first, second, and third acute angles are different.

12. The dump body pivot pin, suspension node, and rear frame connection casting according to claim 9, wherein the tube connection bosses are adapted to have weldably attached thereto respective frame tubes or suspension linkages.

13. The dump body pivot pin, suspension node, and rear frame connection casting according to claim 9, wherein the dump body pivot pin boss is a solid cylinder except for the pivot pin bore.

14. The dump body pivot pin, suspension node, and rear frame connection casting according to claim 9,
 wherein the rear suspension connection boss is below the dump body pivot pin boss such that a portion of the dump body pivot pin boss overlaps a portion of the rear suspension connection boss in a top plan view and a side elevational view of the dump body pivot pin, suspension node, and rear frame connection casting, and
 wherein the support tube connection boss is offset in a forward direction from the rear suspension connection boss and the dump body pivot pin boss such that no portion of the support tube connection boss overlaps any portion of the rear suspension connection boss and the dump body pivot pin boss in a top plan view and a side elevational view of the dump body pivot pin, suspension node, and rear frame connection casting.

15. The dump body pivot pin, suspension node, and rear frame connection casting according to claim 9, wherein the upper beam is longer than the lower beam.

16. A method regarding a dump body pivot pin, suspension node, and rear frame connection comprising:
 providing a dump body pivot pin boss, wherein the dump pivot pin boss has a pivot pin bore, a pin bore center axis, an inner flat surface perpendicular to the pin bore center axis, and an outer flat surface perpendicular to the pin bore center axis;
 providing a rear suspension connection boss, wherein the rear suspension connection boss includes a suspension connection center axis, an inner flat surface perpendicular to the suspension connection center axis, and an outer flat surface perpendicular to the suspension connection center axis;
 providing an outer upper rear frame tube connection boss;
 providing an inner upper rear frame tube connection boss;
 providing an outer lower rear frame tube connection boss;
 providing an inner lower rear frame tube connection boss;
 providing an upper beam connecting the outer upper rear frame tube connection boss to the dump body pivot pin boss and connecting the inner upper rear frame tube connection boss to the dump body pivot pin boss;
 providing a lower beam connecting the outer lower rear frame connection boss to the rear suspension connection boss and the dump body pivot pin boss and connecting the inner lower rear frame tube connection boss to the dump body pivot pin boss;
 providing a beam connection web connecting the upper beam to the lower beam; and
 providing a support tube connection boss having a center axis, wherein the center axis of the support tube connection boss is parallel to the pin bore center axis of the dump body pivot pin boss and the suspension connection center axis of the rear suspension connection boss,
 wherein the outer upper rear frame tube connection boss and the inner upper rear frame tube connection boss are at a first acute angle with respect to each other in a top plan view of the dump body pivot pin, suspension node, and rear frame connection,
 wherein the outer lower rear frame tube connection boss and the inner lower rear frame tube connection boss are at a second acute angle with respect to each other in the top plan view of the dump body pivot pin, suspension node, and rear frame connection, and
 wherein the upper beam and the lower beam are at a third acute angle with respect to each other in a side elevational view of the dump body pivot pin, suspension node, and rear frame connection.

17. The method according to claim 16, further comprising:
- castably attaching the outer and inner upper rear frame tube connection bosses to the upper beam; and
- castably attaching the outer and inner lower rear frame tube connection bosses to the lower beam.

18. The method according to claim 16, wherein each of the tube connection bosses except the support tube connection boss tapers from thick to thin toward the dump body pivot pin boss.

19. The method according to claim 16, wherein respective casting interfaces are provided between the outer and inner upper rear frame tube connection bosses and the upper beam and between the outer and inner lower rear frame tube connection bosses and the lower beam.

20. The method according to claim 16, further comprising weldably attaching respective elongate support members to the tube connection bosses.

\* \* \* \* \*